United States Statutory Invention Registration [19]

[11] Reg. Number: H166

Byrd [43] Published: Nov. 4, 1986

[54] DUAL AREA TANGENT PISTON

[75] Inventor: Joe L. Byrd, Huntsville, Ala.

[73] Assignee: The United States of America as represented by the Secretary of the Army, Washington, D.C.

[21] Appl. No.: 865,492

[22] Filed: May 19, 1986

[51] Int. Cl.[4] ..... F01B 9/00

[52] U.S. Cl. ..... 92/138; 92/165 PR

*Primary Examiner*—Harold J. Tudor

*Attorney, Agent, or Firm*—Anthony T. Lane; Freddie M. Bush; James T. Deaton

[57] ABSTRACT

A dual area tangent piston is provided that includes two integrally connected pistons of different cross-sectional areas with the pistons being non-concentric and aligned at one side along a common line at a common tangent point of each piston area.

7 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DUAL AREA TANGENT PISTON

DEDICATORY CLAUSE

The invention described herein may be manufactured, used, and licensed by or for the Government for governmental purposes without the payment to me of any royalties thereon.

BACKGROUND OF THE INVENTION

In the past, various approaches have been made to provide piston actuators that are of small size and able to actuate various devices. However, the devices that have been produced are not of such structure as to enable them to be made small enough for applicant's purpose in a missile that requires a very small overall diameter device.

With the above need in mind, it is an object of this invention to provide a dual area tangent piston that has space on a larger piston to which an actuator can be attached and have the actuator positioned to extend generally longitudinally of a smaller area tangent piston.

Another object of this invention is to provide non-concentric pistons which produce moments on the piston which counteract moments produced by a side mounting link when the link is in compression to thus reduce piston side load.

Still another object of this invention is to provide a dual area piston with an external side mounted connecting link which allows an output crank and shaft to be located adjacent the head end of the smaller piston.

A still further object of this invention is to provide a dual area piston with a point on the edge of one cross-sectional area of the piston which is tangent or flush with a point on the edge of another cross-sectional area of a dual area piston with non-concentric cross-sectional area which prevents piston rotation while allowing longitudinal motion.

Still another object of this invention is to provide a piston that is designed to reduce the angular motion on a connecting rod attached thereto by reducing the sine-cosine effects due to piston motion.

Other objects and advantages of this invention will be obvious to those skilled in this art.

SUMMARY OF THE INVENTION

In accordance with this invention, a dual area piston is provided which includes two different size cross-sectional area pistons which are usually, but not necessarily, round in shape and which are aligned along a common line with the two different diameters of the cylindrical pistons being tangent at one point where the two diameters interface. The larger diameter piston has an external linkage attached thereto and occupying the space adjacent the smaller piston to provide a very compact arrangement with a linkage for connecting to an output which receives oscillatory motion from the pistons and output shaft. The oscillatory output shaft motion and tangent piston arrangement minimizes the longitudinal length of the piston/rod/crank assembly since the output shaft is located adjacent the end of the smaller piston.

DESCRIPTION OF THE PREFERRED EMBODIMENT

Figure 1:
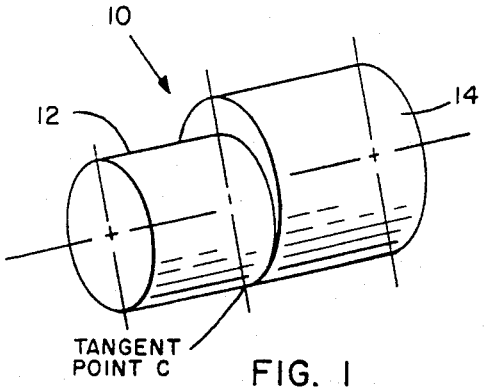
FIG. 1 is a perspective view of the piston arrangement in accordance with this invention.
Figure 2:
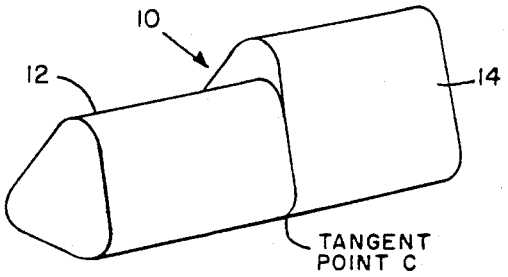
FIG. 2 is a perspective view of another piston arrangement in accordance with this invention, FIG. 3 schematically illustrates the piston arrangement mounted in a cylinder housing and with portions cut away and portions in sections, FIG. 4 schematically illustrates the piston arrangement in a cylinder housing and with a linkage pivoted to the larger piston.
Figure 3:
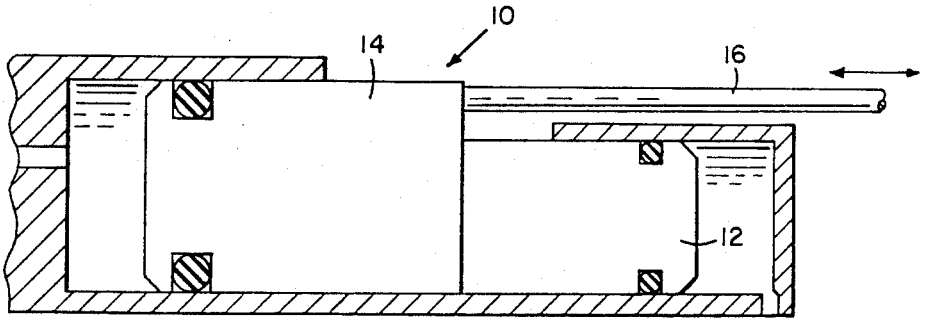
Figure 4:
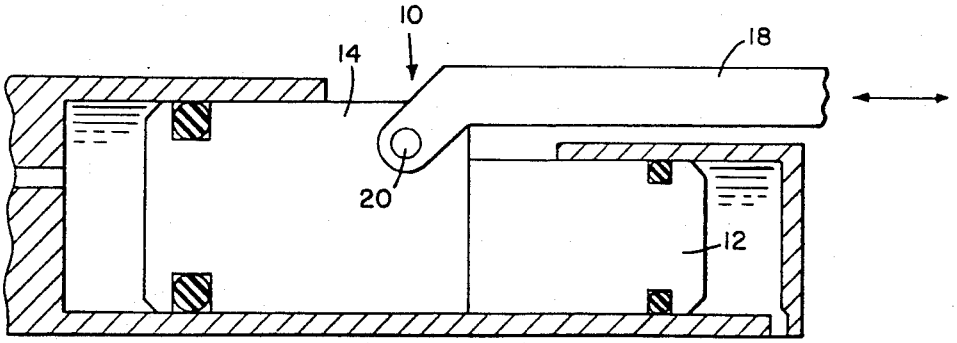

Referring now to the drawings a dual area piston 10 in accordance with this invention includes two integrally connected pistons 12 and 14 of different size cross-sectional areas with the pistons being non-concentric and aligned along a common line at one side of the pistons at a tangent point C as designated for pistons 12 and 14. The piston shapes illustrated in FIG. 1 are round; however, other piston shapes such as illustrated in FIG. 2 can be equally well used to advantage. In the case of the round pistons of FIG. 1, the two different diameters of cylindrical pistons 12 and 14 are tangent at tangent point C where the two diameters interface to thereby form tangent pistons. As illustrated in FIGS. 3 and 4, external linkage is readily connectable to larger piston 14 at one side of the larger piston which is directly opposite the point of tangency of the two pistons. This is illustrated in FIG. 3 with the rod 16 being made integral or integrally secured to piston 14. Also, the linkage can be a lever 18 as illustrated in FIG. 4 and pivotly secured at 20 as diameter piston as illustrated. Linkages 16 and 18 enable the device to be attached to other components to recover work from or input work to piston 10. Piston 10 is adapted to be used in a fluid motor type housing 22 as illustrated in FIGS. 3 through 5 and to be used with a pilot valve arrangement 24 as illustrated in FIG. 5.

Figure 5:
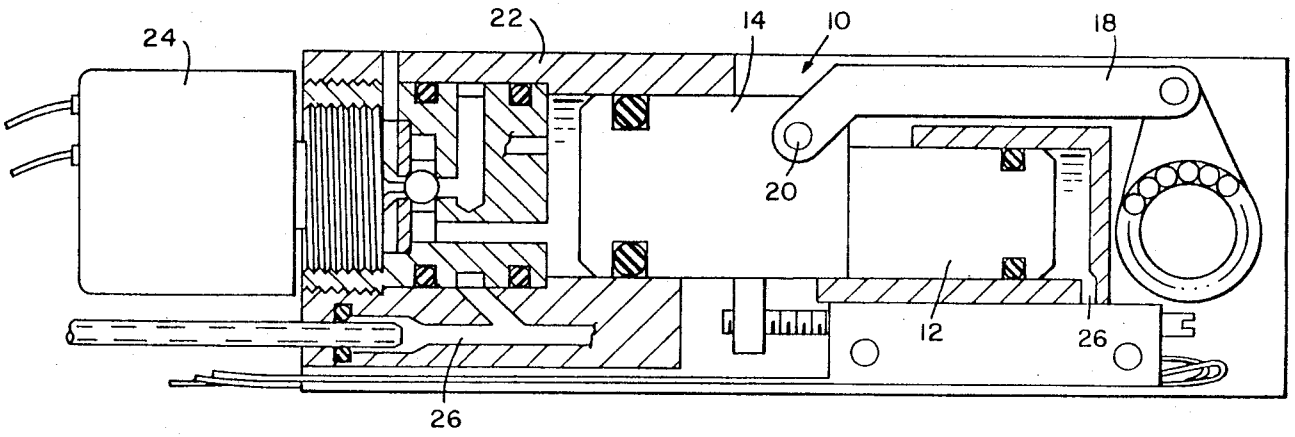
FIG. 5 illustrates the piston arrangement with its linkage connected for doing work and controls for supplying and exhausting of fluid to opposite sides of the pistons.

In operation, piston 10 is designed to be used in a fluid motor arrangement such as illustrated in FIG. 5 wherein fluid is supplied to passage 26 and to opposite ends of piston 10. Pilot valve 24 is utilized for controlling supply to the large end of piston 10 and for exhausting from the large end of piston 10. Control of fluid to the opposite ends of piston 10 cause the piston to be reciprocated and lever 18 connected thereto for doing work such as actuation of control fins of a missile through a crank assembly. As will be appreciated, the tangent piston arrangement provides for oscillatory output shaft motion which minimizes the longitudinal length of the piston/rod/crank assembly since the output shaft is located adjacent and generally cylindrically of the smaller piston. Also, applicant's piston arrangement provides for the smallest practical sized package for oscillatory motion of an output shaft.

I claim:

1. A dual area tangent piston comprising two integrally connected pistons of different size cross-sectional areas, said pistons being non-concentric and aligned along a common line at one side of the pistons at a tangent point of each piston and on said common line.

2. A dual area tangent piston as set forth in claim 1, wherein said cross-sectional areas are each circular in shape.

3. A dual area tangent piston as set forth in claim 2, wherein said piston with the larger cross-sectional area has a linkage attached thereto and being directly opposite said common line.

4. A dual area tangent piston as set forth in claim 3, wherein said linkage attached to said larger cross-sectional area piston is attached by being pivotally connected to said larger cross-sectional area piston.

5. A dual area tangent piston as set forth in claim 1, wherein said piston with the larger cross-sectional area has a linkage attached thereto and being directly opposite said common line.

6. A dual area tangent piston as set forth in claim 5, wherein said linkage is attached by being pivotally connected to said larger cross-sectional area piston.

7. A dual area tangent piston as set forth in claim 1, wherein said piston is mounted in a cylindrical housing with a chamber in said housing at opposite ends of said piston, and pilot valve control means connected for supplying and exhausting fluid to said opposite ends of said piston to cause said piston to be moved back and forth in oscillatory motion.

* * * * *